United States Patent [19]

Eastman

[11] Patent Number: 5,401,056
[45] Date of Patent: Mar. 28, 1995

[54] MODULAR VEHICLE CONSTRUCTED OF FRONT, REAR AND CENTER VEHICULAR SECTIONS

[76] Inventor: Clayton Eastman, 221 Oak St., Box 5A, Brockton, Mass. 02401

[21] Appl. No.: 209,636

[22] Filed: Mar. 11, 1994

[51] Int. Cl.⁶ ............................................. B62D 21/12
[52] U.S. Cl. ..................................... 280/785; 296/196
[58] Field of Search ............... 280/785, 781; 296/196, 296/197; 244/120

[56] References Cited

U.S. PATENT DOCUMENTS

| | | | |
|---|---|---|---|
| 2,148,781 | 2/1939 | Smith | 200/285 |
| 2,716,040 | 8/1955 | Barenyi | 280/785 X |
| 3,000,649 | 9/1961 | Heer et al. | 280/785 |
| 4,027,913 | 6/1977 | Yongers et al. | 296/28 J |
| 4,342,146 | 8/1982 | Hanson | 280/785 X |
| 4,573,734 | 3/1986 | Gass | 296/189 |
| 4,676,545 | 6/1987 | Bonfilio et al. | 296/197 |
| 4,711,467 | 12/1987 | Link et al. | 280/785 |
| 4,732,819 | 3/1988 | Komuro | 280/785 X |
| 4,881,756 | 11/1989 | Kumasaka et al. | 280/785 |

FOREIGN PATENT DOCUMENTS

| | | | |
|---|---|---|---|
| 9004534 | 5/1990 | European Pat. Off. | 280/785 |
| 2620402 | 3/1989 | France | 280/285 |
| 2645106 | 10/1990 | France | 280/785 |
| 4212180 | 9/1993 | Germany | 280/785 |
| 1654098 | 6/1991 | U.S.S.R. | 280/785 |

Primary Examiner—Margaret A. Focarino
Assistant Examiner—Christopher P. Ellis
Attorney, Agent, or Firm—John R. Flanagan

[57] ABSTRACT

A modular vehicle is constructed of front, rear and center vehicular sections. The front vehicular section includes a steering wheel, front steerable wheels and a steering linkage mounted on a front chassis portion, with the steering linkage steerably connecting the steering wheel to the front steerable wheels. The rear vehicular section includes a motor, rear drive wheels and a drive transmission mounted on a rear chassis portion, with the drive transmission drivingly connecting the motor to the rear drive wheels. The center vehicular section has a seat and roll cage mounted on a center chassis portion. The modular vehicle also includes a plurality of releasable connections attached to and disposed between respective adjacent upright extending segments of the front, rear and center chassis portions of the front, rear and center vehicular sections. The releasable connections include a plurality of removably interfitted elements respectively attached on and projecting from the adjacent upright extending segments and a plurality of couplers for releasably securing the interfitted elements together to detachably attached the front and rear vehicular sections to the center vehicular section so as to permit interchangeability of sections of different designs and ease of transport of the vehicle.

20 Claims, 2 Drawing Sheets

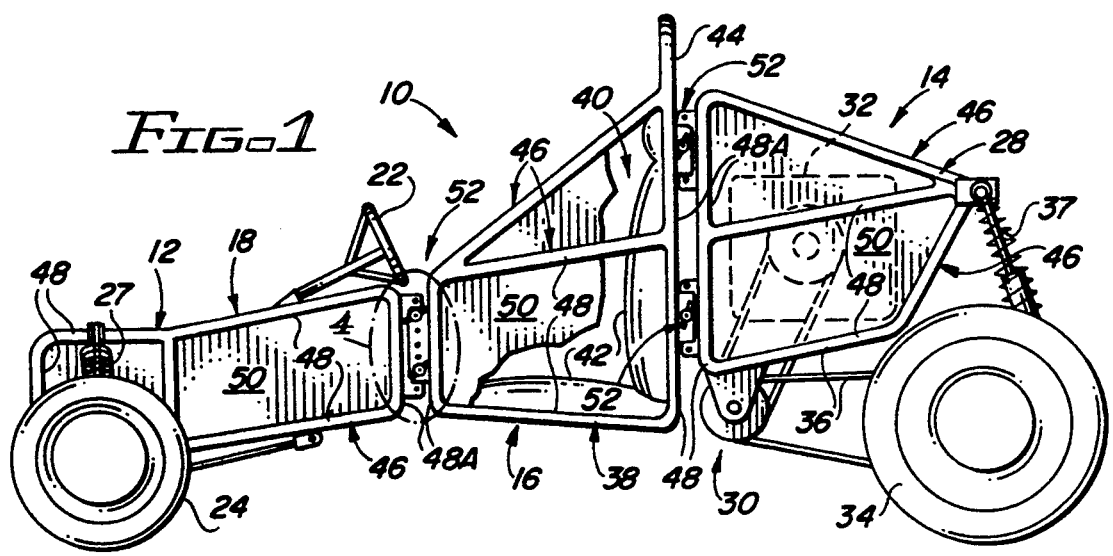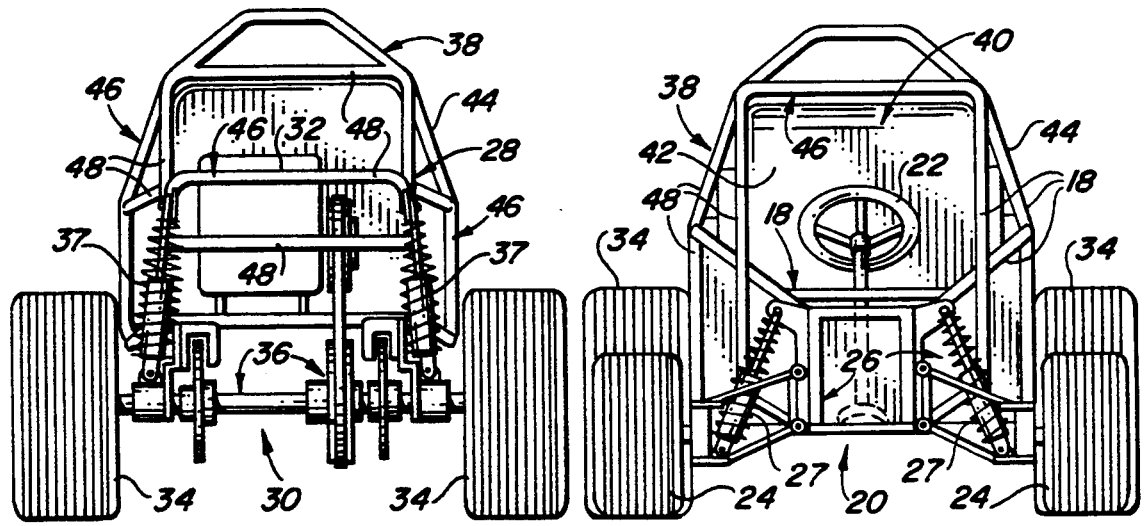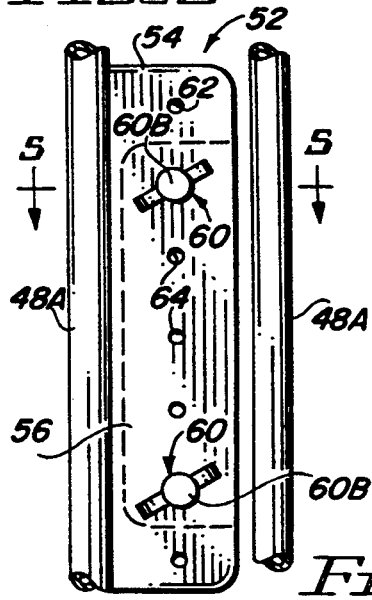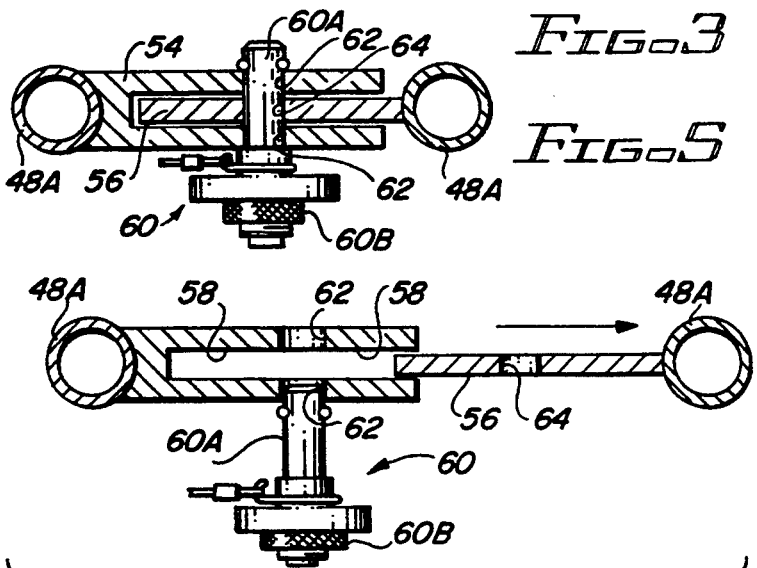

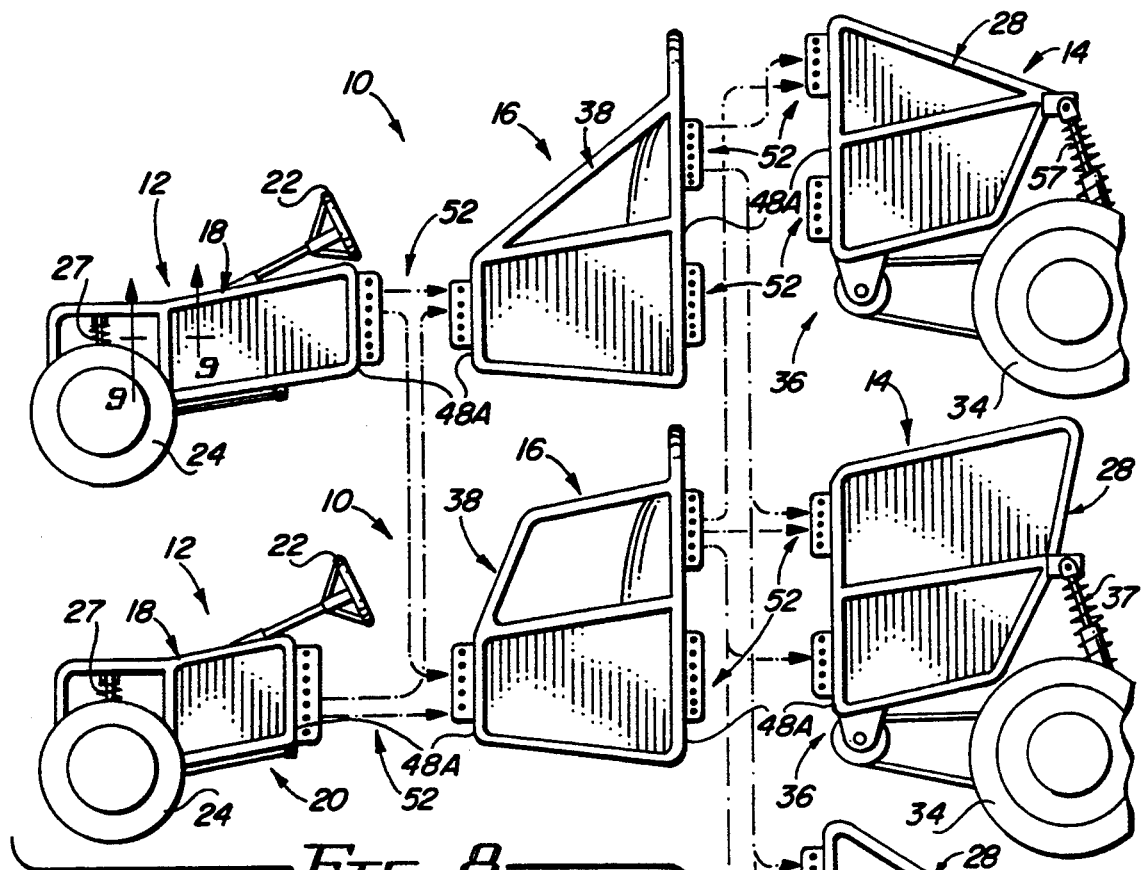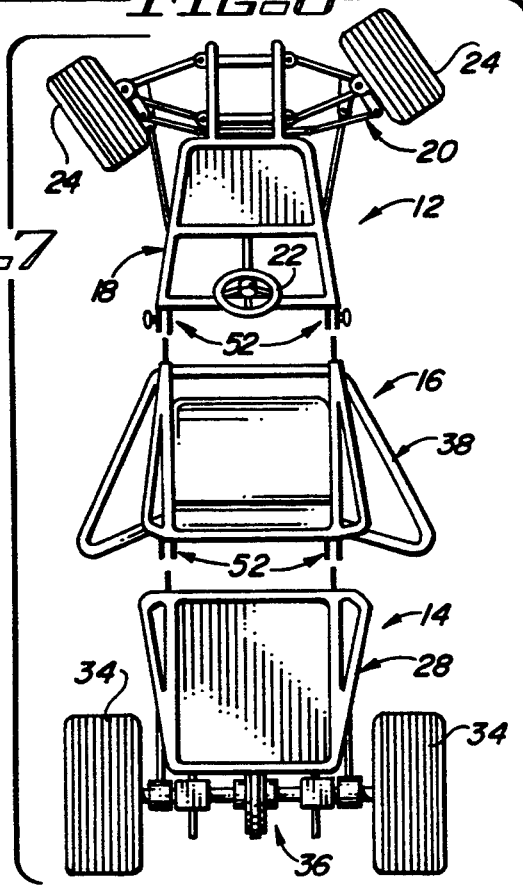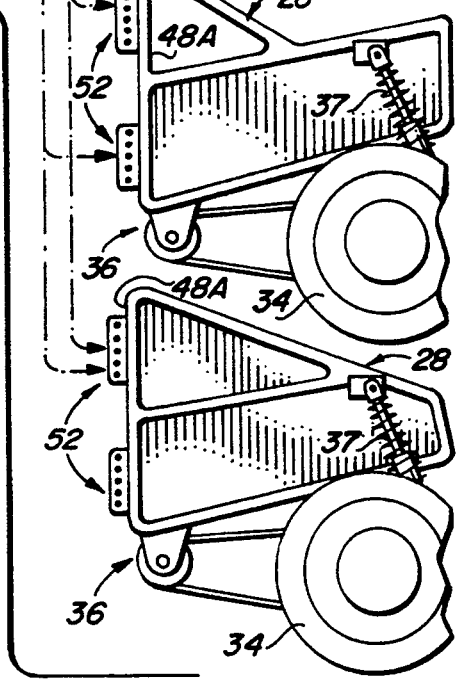

MODULAR VEHICLE CONSTRUCTED OF FRONT, REAR AND CENTER VEHICULAR SECTIONS

BACKGROUND OF THE INVENTION

1. Field of the Invention

The present invention generally relates to vehicular construction and, more particularly, is concerned with a modular vehicle constructed of front, rear and center vehicular sections permitting the ability to disassemble and reassemble a given vehicle using front, rear and center vehicular sections with the same or different designs.

2. Description of the Prior Art

The major elements of a vehicle are the chassis on which all other elements are assembled, such as, the transmission, engine, steering mechanism and various other components. In a typical automobile, the chassis or structural frame is composed of a horizontal network of beams and tubular steel members. Various proposals have appeared in the prior patent art for modularization of the construction of a vehicle chassis to reduce costs and make the assembling of the chassis easier so that it can be performed more quickly.

Representative examples of modularization of vehicle chassis construction are found in U.S. patents to Bonfilio et al (U.S. Pat. No. 4,676,545) and Kumasaka et al (U.S. Pat. No. 4,881,756). Bonfilio et al discloses a chassis of modular structure being usable in conjunction with a broad range of different body configurations to create land, sea or air vehicles of any desired type. The chassis is composed of two identical cradles which are bridged by a floor tray. The Kumasaka et al patent discloses a chassis structure which is constituted by three frame sections, i.e., a front frame module, a central frame module and a rear frame module. The front frame module has sub-assemblies, such as an engine, wheels and suspension system thereon. The rear frame module has sub-assemblies, such as wheels and suspension system supported thereon. Also, passage and luggage compartments are installed on the rear and central frame sections.

While the aforementioned patents represent steps taken in the right direction. A need still exists for a vehicle with a modular construction which will overcome the drawbacks of the prior art.

SUMMARY OF THE INVENTION

The present invention provides a vehicle with a modular construction designed to satisfy the aforementioned need. The modular vehicle of the present invention is constructed from front, rear and center vehicle sections. The center, front and rear vehicle sections each has a family of different designs such that modular vehicles with different combinations of the designs can be easily and quickly disassembled and reassembled as desired.

Accordingly, the present invention is directed to a modular vehicle which comprises a plurality of front, rear and center vehicular sections. The front vehicular section includes a front chassis portion and a vehicular steering system mounted thereon. Preferably, the vehicular steering system includes a steering wheel, a pair of front steerable wheels and a steering linkage mounted on the front chassis portion, with the steering linkage steerably connecting the steering wheel to the front steerable wheels. The rear vehicular section includes a rear chassis portion and a vehicular drive system mounted thereon. Preferably, the vehicular drive system includes a motor, a pair of rear drive wheels and a drive transmission mounted on the rear chassis portion, with the drive transmission drivingly connecting the motor to the rear drive wheels. The center vehicular section includes a center chassis portion and a vehicular driver compartment mounted thereon. Preferably, the vehicular driver compartment includes a seat and a roll cage mounted on the center chassis portion.

Each of the front, rear, and center chassis portions of the modular vehicle includes a plurality of interconnected three-dimensional polygonal-shaped frameworks defined by a plurality of elongated rigid tubular members rigidly connected to one another. The three-dimensional polygonal-shaped frameworks have various different configurations, such a trapezoidal, parallelogram and triangular configurations.

The modular vehicle of the present invention further comprises a plurality of releasable connections attached to and disposed between respective adjacent generally upright extending segments of the front, rear and center chassis portions of the front, rear and center vehicular sections. The releasable connections include a plurality of removably interfitted elements respectively attached on and projecting from the adjacent segments of upright extending ones of the rigid tubular members of the frameworks of the front, rear and center chassis portions and a plurality of couplers for releasably securing the interfitted elements together to detachably attached the front and rear vehicular sections to the center vehicular section.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a side elevational view of a vehicle with a modular construction in accordance with the present invention.

FIG. 2 is a rear elevational view of the vehicle of FIG. 1.

FIG. 3 is a front elevational view of the vehicle of FIG. 1.

FIG. 4 is an enlarged detailed view of the one of a plurality of releasable connections employed by the modular vehicle as enclosed in oval 4 of FIG. 1.

FIG. 5 is an enlarged cross-sectional view of the releasable connection of FIG. 4 showing interfitted elements and a coupler of releasable connection in a coupled condition.

FIG. 6 is a view similar to that of FIG. 5 but showing the interfitted elements and coupler of the releasable connection in an uncoupled condition.

FIG. 7 is an exploded top plan view of the modular vehicle of FIG. 1.

FIG. 8 is an exploded side elevational view showing different possible combinations of front, rear and center vehicular sections for constructing modular vehicles having different designs.

FIG. 9 is an enlarged fragmentary sectional view taken along line 9—9 of FIG. 8, showing an alternative configuration for the tubular members of the front, rear and center chassis portions of the modular vehicle.

DETAILED DESCRIPTION OF THE INVENTION

Referring to the drawings, and particularly to FIGS. 1-3 and 7, there is illustrated a module vehicle, generally designated 10, in accordance with the present invention. The modular vehicle 10 basically includes a front vehicular section 12, a rear vehicular section 14 and a center vehicular section 16.

The front vehicular section 12 includes a front chassis portion 18 and a vehicular steering system 20 mounted thereon. Preferably, the vehicular steering system 20 includes a steering wheel 22, a pair of front steerable wheels 24, and a steering linkage 26 mounted on the front chassis portion 18. The steering linkage 26 steerably connects the steering wheel 22 to the front steerable wheels 24. The front vehicular section 12 also preferably includes a shock absorbing system 27 coupled between the front chassis portion 18 and front steerable wheels 24.

The rear vehicular section 14 includes a rear chassis portion 28 and a vehicular drive system 30 mounted thereon. Preferably, the vehicular drive system 30 includes a motor 32, a pair of rear drive wheels 34, and a drive transmission 36 mounted on the rear chassis portion 28. The drive transmission 36 drivingly connects the motor 32 to the rear drive wheels 34. The rear vehicular section 14 also preferably includes a shock absorbing system 37 coupled between the rear chassis portion and rear drive wheels 34.

The center vehicular section 16 includes a center chassis portion 38 and a vehicular driver compartment 40 mounted thereon. Preferably, the vehicular driver compartment 40 includes a seat 42 and a roll cage 44 mounted on the center chassis portion 38.

Referring still to FIGS. 1-3, each of the front, rear, and center chassis portions 18, 28, 38 of the modular vehicle 10 includes a plurality of interconnected three-dimensional polygonal-shaped open frameworks 46 defined by a plurality of elongated rigid tubular members 48 rigidly connected to one another. The tubular members 48 of the front, rear and center chassis portion 18 include generally upright extending segments 48A disposed at a generally vertically extending rear end of the front chassis portion 18, at a generally vertically extending front end of the rear chassis portion 28 and at opposite generally vertically extending front and rear ends of the center chassis portion 38. Preferably, the tubular members 48 are fabricated of a suitable metal material, such as aluminum. The tubular members 48 can have circular cross sections, as shown in FIG. 6, or square cross sections, as shown in FIG. 9. Also, flat panels 50 can be connected with some of the tubular members 48 to fill in and close portions of the frameworks 44 to provide sides on the modular vehicle 10. As seen in FIGS. 1-3 and 8, the three-dimensional polygonal-shaped frameworks 44 have various different configurations, such a trapezoidal, parallelogram and triangular configurations.

Referring to FIGS. 1 and 4-8, the modular vehicle 10 of the present invention further includes a plurality of releasable connections 52 disposed between and attached to respective adjacently disposed upright extending pairs of segments of upright extending ones 48A of the tubular members 48 of the front, rear and center chassis portions 18, .28, 38 of the front, rear and center vehicular sections 12, 14, 16. In the example clearly illustrated in FIGS. 4-6, the releasable connections 52 include a plurality of sets of removably interfitted elements 54, 56 respectively attached on and projecting from the adjacent segments of upright extending ones 48A of the rigid tubular members 48 of the frameworks 46 of the front, rear and center chassis portions 18, 28, 38. Each set of interfitted elements forming one of the releasable connections 52 includes a bifurcated element 54 defining a slot 58 and a flat blade-like element 56 having a thickness slightly less that the width of the slot 58 so as to provide a close fitted relationship between the blade-like element 56 and the bifurcated element 54. Also, each releasable connection 52 includes a coupler 60 having a stem 60A for insertion through an aligned pair of holes 62, 64 in rows thereof formed in the respective interfitted elements 54, 56 to releasably secure the interfitted elements 54, 56 together to detachably attached respective the front and rear vehicular sections 12, 14 to the center vehicular section 16. Preferably, as an example, the coupler 60 is a quick release adjustable ball lock pin, such as one sold by Carr Lane Mfg. Co of St. Louis, Mo. In addition to the stem 60A, the coupler 60 also includes knurled nut 60B operable in a known manner to lock to and unlock from the connection 52.

Referring to FIG. 8, there is illustrated various different possible combinations of front, rear and center vehicular sections 12, 14, 16 for constructing modular vehicles having different designs. Each of the front, rear and center chassis portions 18, 28, 38 includes the releasable connections 52 thereon such that a modular vehicle 10 can be assembled, disassembled and reassembled using different combinations of the front, rear and center chassis portions 18, 28, 38. These different interchangeable combinations of front, rear and center chassis portions 18, 28, 38 would permit the construction of modular vehicles with different configurations, such as coupe, sedan, station wagon and pickup bed configurations as well as the interchange between such different configurations.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:
1. A modular vehicle, comprising:
   (a) a front vehicular section including a front chassis portion and a vehicular steering system mounted thereon, said front chassis portion including generally upright extending segments disposed at a generally vertically extending rear end of said front chassis portion;
   (b) a rear vehicular section including a rear chassis portion and a vehicular drive system mounted thereon, said rear chassis portion including generally upright extending segments disposed at a generally vertically extending front end of said rear chassis portion;
   (c) a center vehicular section including a center chassis portion and a vehicular driver compartment mounted thereon, said center chassis portion including generally upright extending segments disposed at opposite generally vertically extending front and rear ends of said center chassis portion; and

(d) a plurality of releasable connections attached to and disposed between respective adjacently-disposed pairs of said generally upright extending segments of said front and center chassis portions of said respective front and center vehicular sections and attached to and disposed between respective adjacently-disposed pairs of said generally upright extending segments of said rear and center chassis portions of said respective rear and center vehicular sections.

2. The modular vehicle of claim 1 wherein said vehicular steering system includes a steering wheel, a pair of front steerable wheels and a steering linkage mounted on said front chassis portion, said steering linkage steerably connecting said steering wheel to said front steerable wheels.

3. The modular vehicle of claim 2 wherein said front vehicular section also includes a shock absorbing system coupled between said front chassis portion and said front steerable wheels.

4. The modular vehicle of claim 1 wherein said vehicular drive system includes a motor, a pair of rear drive wheels and a drive transmission mounted on said rear chassis portion, said drive transmission drivingly connecting said motor to said rear drive wheels.

5. The modular vehicle of claim 4 wherein said rear vehicular section also includes a shock absorbing system coupled between said rear chassis portion and said rear drive wheels.

6. The modular vehicle of claim 1 wherein said vehicular driver compartment includes a seat and a roll cage mounted on said center chassis portion.

7. The modular vehicle of claim 1 wherein each of said front chassis portion, rear chassis portion and center chassis portion includes a plurality of interconnected three-dimensional polygonal-shaped rigid frameworks defined by a plurality of elongated rigid tubular members rigidly connected to one another, selected ones of said elongated rigid tubular members defining said generally upright extending segments.

8. The modular vehicle of claim 7 wherein at least one of said three-dimensional polygonal-shaped frameworks has a trapezoidal configuration.

9. The modular vehicle of claim 7 wherein at least one of said three-dimensional polygonal-shaped frameworks has a parallelogram configuration.

10. The modular vehicle of claim 7 wherein at least one of said three-dimensional polygonal-shaped frameworks has a triangular configuration.

11. The modular vehicle of claim 1 wherein said releasable connections include a plurality of removably interfitted elements respectively attached on and projecting from said adjacently-disposed pairs of generally upright extending segments and a plurality of couplers for releasably securing the interfitted elements together to detachably attach said generally vertically extending rear end of said front vehicular section and said generally vertically extending front end of said rear vehicular section to said opposite generally vertically extending front and rear ends of said center vehicular section.

12. The modular vehicle of claim 1 wherein each of said front, rear and center chassis portions has a plurality of different configurations including said releasable connections thereon such that a modular vehicle can be assembled, disassembled and reassembled with different combinations of said front, rear and center chassis portions.

13. A modular vehicle, comprising:
(a) a front vehicular section including a front chassis portion and a steering wheel, front steerable wheels and steering linkage mounted on said front chassis portion, said steering linkage steerably connecting said steering wheel to said front steerable wheels, said front chassis portion including generally upright extending segments disposed at a generally vertically extending rear end of said front chassis portion;

(b) a rear vehicular section including a rear chassis portion and a motor, rear drive wheels and a drive transmission mounted on said rear chassis portion, said drive transmission drivingly connecting said motor to said rear drive wheels, said rear chassis portion including generally upright extending segments disposed at a generally vertically extending front end of said rear chassis portion;

(c) a center vehicular section including a center chassis portion and a seat and a roll cage mounted on said center chassis portion, said center chassis portion including generally upright extending segments disposed at opposite generally vertically extending front and rear ends of said center chassis portion; and (d) a plurality of releasable connections attached to and disposed between respective adjacently-disposed pairs of said generally upright extending segments of said front and center chassis portions of said respective front and center vehicular sections and attached to and disposed between respective adjacently-disposed pairs of said generally upright extending segments of said rear and center chassis portions of said respective rear and center vehicular sections.

14. The modular vehicle of claim 13 wherein:
said front vehicular section also includes a shock absorbing system coupled between said front chassis portion and said front steerable wheels; and
said rear vehicular section also includes a shock absorbing system coupled between said rear chassis portion and said rear drive wheels.

15. The modular vehicle of claim 13 wherein said releasable connections include a plurality of removably interfitted elements respectively attached on and projecting from said adjacently-disposed pairs of generally upright extending segments and a plurality of couplers for releasably securing the interfitted elements together to detachably attach said generally vertically extending rear end of said front vehicular section and said generally vertically extending front end of said rear vehicular section to said opposite generally vertically extending front and rear ends of said center vehicular section.

16. The modular vehicle of claim 15 wherein each of said front, rear and center chassis portions has a plurality of different configurations including said releasable connections thereon such that a modular vehicle can be assembled, disassembled and reassembled with different combinations of said front, rear and center chassis portions.

17. The modular vehicle of claim 13 wherein each of said front chassis portion, rear chassis portion and center chassis portion includes a plurality of interconnected three-dimensional polygonal-shaped frameworks defined by a plurality of elongated rigid tubular members rigidly connected to one another.

18. The modular vehicle of claim 17 wherein at least one of said three-dimensional polygonal-shaped frameworks has a trapezoidal configuration.

19. The modular vehicle of claim 17 wherein at least one of said three-dimensional polygonal-shaped frameworks has a parallelogram configuration.

20. The modular vehicle of claim 17 wherein at least one of said three-dimensional polygonal-shaped frameworks has a triangular configuration.

* * * * *